Aug. 22, 1961     H. G. FORTUNE     2,997,192
CONVERTIBLE TRAILER
Filed March 14, 1960     4 Sheets-Sheet 1
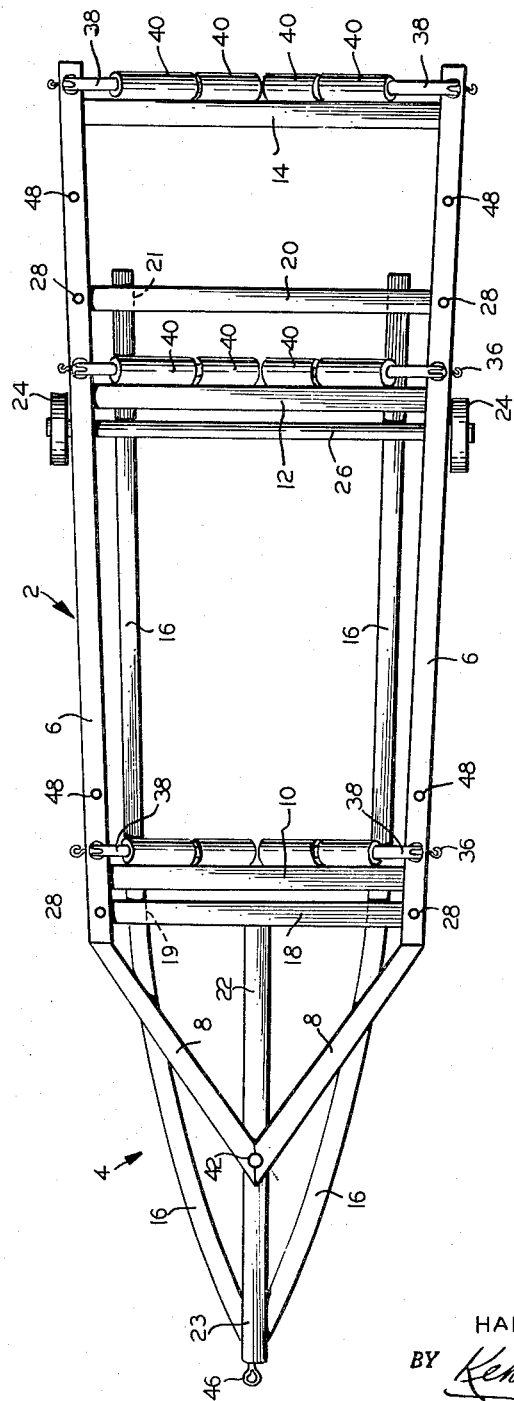
FIG. I
*INVENTOR.*
HAROLD G. FORTUNE
BY *Kenwood Ross*
ATTORNEY Aug. 22, 1961   H. G. FORTUNE   2,997,192
CONVERTIBLE TRAILER
Filed March 14, 1960   4 Sheets-Sheet 2
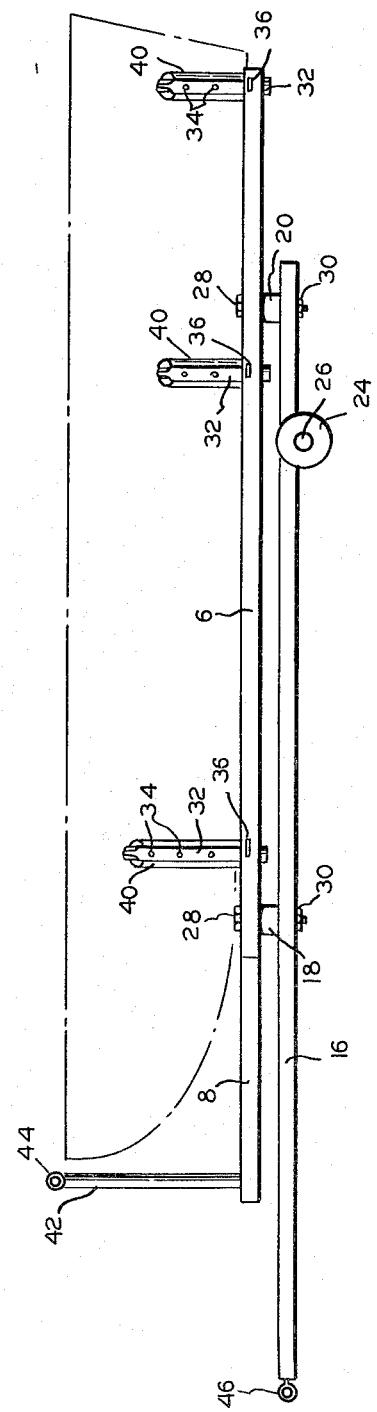
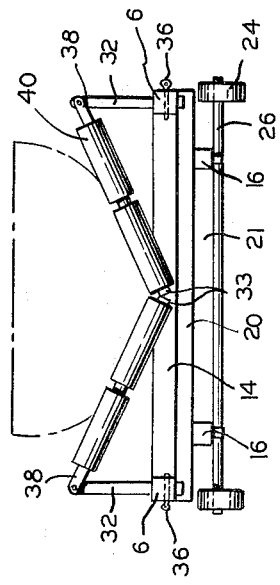
INVENTOR.
HAROLD G. FORTUNE
BY *Kenwood Ross*
ATTORNEY

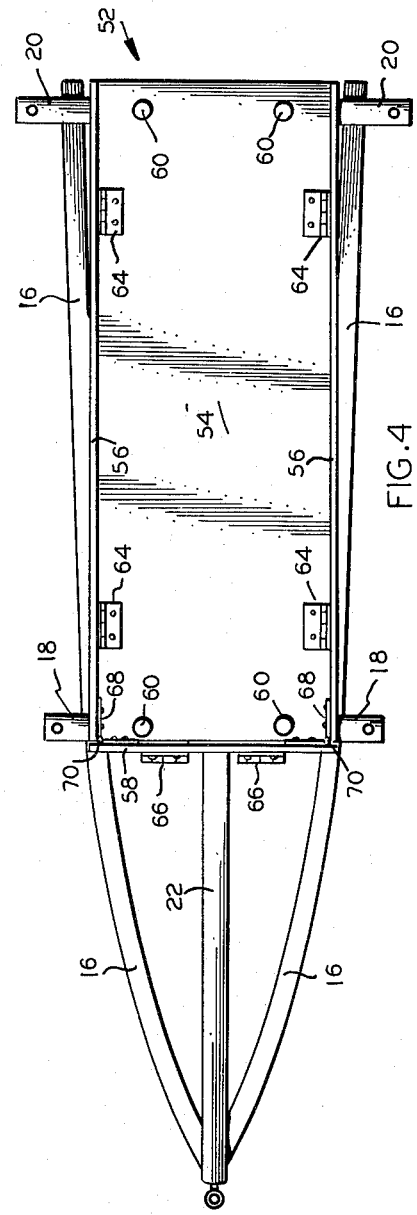
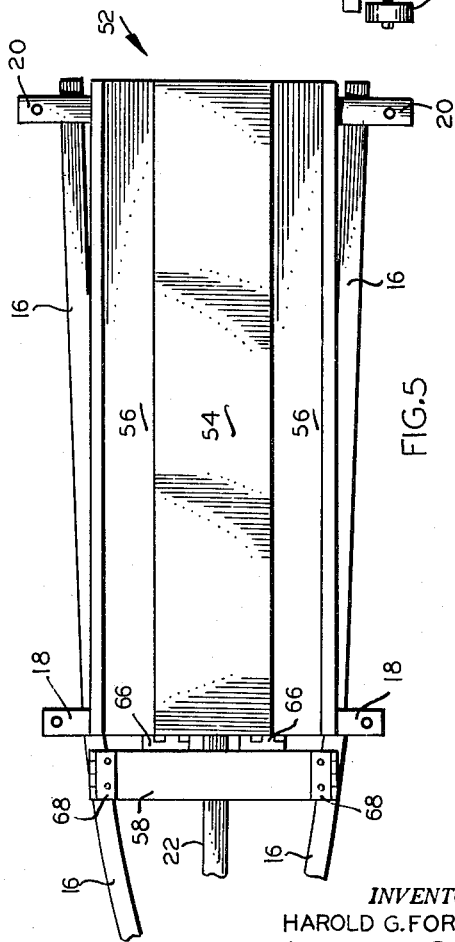
INVENTOR.
HAROLD G. FORTUNE
BY Kenwood Ross
ATTORNEY

Aug. 22, 1961 H. G. FORTUNE 2,997,192
CONVERTIBLE TRAILER
Filed March 14, 1960 4 Sheets-Sheet 4
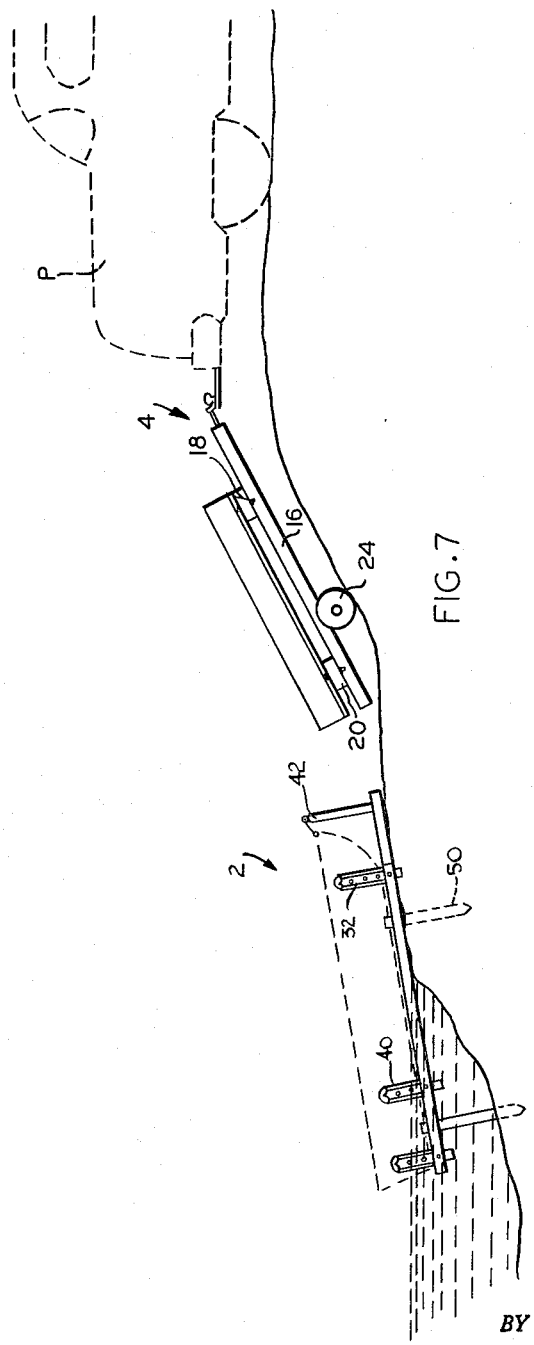
INVENTOR.
HAROLD G. FORTUNE
BY Kenwood Ross
ATTORNEY United States Patent Office 2,997,192
Patented Aug. 22, 1961

2,997,192
CONVERTIBLE TRAILER
Harold G. Fortune, North Pole, N.Y.
Filed Mar. 14, 1960, Ser. No. 14,631
1 Claim. (Cl. 214—515)

The present invention relates to new and useful improvements in structural refinements in a combination or convertible utility-boat trailer and dry dock or slip.

It is a principal object of this invention to provide an inventively novel and improved construction of the type in which a trailer unit and a dry dock unit may be combined to form a single integral unit suitable for transporting a boat over land, said dry dock unit being detachable from said trailer unit to serve as a mooring or docking unit for small craft either on or near bodies of water and as a means for loading and launching a boat at water-level.

Another primary object hereof is to provide a boat trailer and dry dock, which units may be readily separated one from the other.

Still another object is to provide a readily adjustable dry dock which may be varied as to the relationship of certain components to adapt it to the differences in sizes and shapes in a variety of boat hulls it may be called upon to accommodate.

Another feature hereof is to provide a structure which will serve as a semi-permanent dock for boat owners not possessing permanent mooring facilities and desiring nevertheless to anchor a small craft at or near a body of water.

A salient feature of my invention lies in the fact that herewith small craft may be placed in or removed from the dry dock easily and without the objectionable but necessary hauling and pulling heretofore encountered in loading or launching.

A further object hereof is to provide a trailer which is adapted for use as a utility trailer as well as for the function of supporting and transporting a cradle or dry dock unit, and conceivably, the craft supported thereby.

Stated otherwise, the invention contemplates a convertible trailer and dry dock structure which functions on the basic principle that the dry dock or cradle which receives and supports the boat may be removable from the trailer following the launching of the supported boat and may be positionable on the shore in manner whereby the entrance end thereof may be disposed in the water adjacent the shore so that the nose of the boat may be reintroduced to the dry dock or cradle with the cradle being subsequently lifted onto and carried by the trailer for the transportation of the combination unit from place to place.

The invention resides in the particular arrangement, construction and relationship of the various elements, components and instrumentalities of the convertible trailer and dry dock as exemplified in the detailed disclosure hereinafter set forth wherein the stated objects of the invention will be apparent.

Referring to the drawings, wherein like characters of reference are employed to designate like or corresponding parts throughout the several views:

FIG. 1 is a top plan view of the combination trailer and boat dock in the towing position;

FIG. 2 is a side elevational view of the apparatus shown in FIG. 1 and showing a boat in place thereon and ready for the towing function;

FIG. 3 is a rear end elevational view of the apparatus of the invention;

FIG. 4 is a top plan view of the trailer unit of the invention with the carrier body associated therewith;

FIG. 5 is a fragmentary top plan view of the trailer unit showing the head board and sides of the carrier body in the collapsed position.

FIG. 6 is a rear end elevational view of the trailer unit shown in FIG. 5; and

FIG. 7 is a diagrammatic view showing the trailer unit of FIG. 4 attached to a towing vehicle and the dry dock unit anchored adjacent a body of water.

The description which follows is of an exemplary form of the invention and is given with a view to illustrating and explaining the precise nature of the principles of the invention and their embodiment for practical use, in order that others skilled in the art may be enabled to adapt and modify them in numerous embodiments, variations and modifications, each as may be best adapted to the conditions of any particular use.

The objects of the invention are susceptible of attainment by use of constructions different in certain respects from that disclosed such as in size, form, proportion, material, type of subassembly or accessory and the like, all without departing from the underlying principles, scope and spirit of the invention. It is premised, however, that such adaptations and/or modifications should be and are intended to be comprehended within the meaning and range of equivalence of the below subjoining claim, there being no intent to have this invention limited to or circumscribed by any specific details of materials, dimensions or the like.

With continued reference to the drawings, I have shown in FIG. 1 a dry dock unit generally indicated by the numeral 2 superposed upon a trailer unit generally indicated by the numeral 4. Both dry dock 2 and trailer 4 may be constructed of channel iron, or, if an apparatus of less weight is desired, may be constructed of aluminum or equivalent light weight metal.

The frame of the dry dock or cradle 2 is formed from a pair of longitudinally extending side frame members 6, connected together by a pair of bow members 8 and cross brace members 10, 12 and 14.

The bow members 8 are joined together at their forward extremities and extend rearwardly and outwardly to meet the forward extremities of the side frame members 6.

The bow members 8 and the cross members 10, 12 and 14 may be secured to the side frame 6, as by welding or bolting, at their points of intersection.

The trailer 4 is formed from side frame members 16, transverse support beams 18 and 20, transverse cross beams 19 and 21, and a forwardly extending tongue or brace member 22.

The side frame members 16 are attached at their converging forward extremities to the brace member 22 and extend rearwardly and are disposed below the support beams 18 and 20. Said beams 18 and 20 rest upon and are fixed to the frame members 16 as by welding or the like.

The spaced, parallel cross members 19 and 21 are disposed between the side frame members 16 and serve to hold said frame members in spaced relationship. The cross members 18 and 21 are positioned immediately below the support members 18 and 20.

The tongue or brace member 22 extends forwardly from the support beam 18 to a forward extremity 23 where it intersects the frame members 16.

The trailer 4 is mounted on wheels 24 as by an axle 26, whereby the structure may be easily transported.

The cradle or dry dock 2 is releasably affixed to the trailer 4 as by bolts 28. Said bolts are spaced adjacent the opposite ends of the side frames 6 and extend downwardly through said side frames 6 and through the support members 18 and 20. Bolts 28 are threadedly engageable with nuts 30.

Upon removal of nuts 30 and bolts 28, the trailer 4 may be drawn clear of the dry dock 2, as desired.

Spaced vertically extending posts 32 have lower ends which extend through appropriate openings in the side frame members 6 of the dry dock 2. Said posts are aligned relative to each other in each of the side frames.

Each post 32 is provided with a plurality of spaced, transverse openings 34 therethrough. Appropriately aligned transverse openings are also provided in the side frames 6 of the dry dock 2. Securing pins 36 may be passed through the aligned openings in the side frames 6 and posts 32 for securing the posts in different desired positions and allowing the adjustment of the posts that they may extend upwardly above said side frames any desired distance. Said posts 32 may be provided with as many transverse openings as desired to provide a wide latitude in the selection of positions thereof, thereby making the dry dock adaptable for use with various sizes and shapes of small crafts.

Shafts 38 have outer extremities hingedly connected to the upper extremities of the posts 32 and extend downwardly and angularly therefrom to a point centrally of the cross beams 10, 12 and 14 of the dry dock 2 where shafts of a pair may be hingedly connected to each other as by a pin 33.

Hard rubber sleeves or rollers 40 encase each of said shafts 38 and are rotatable thereon. The hull of a boat being transported or moored may be rolled thereon and relative thereto, the rollers acting as insulators against shock or damage to the hull. The rollers 40, being rotatable, aid in the easy passage of a boat into and out of the dry dock.

An upwardly extending staff 42, provided with an eye 44 at its upper extremity, is provided at the prow of the dry dock 2. A line may be passed from the boat to the eye 44 of said staff 44, thereby anchoring the boat in position in the drydock.

An eye 46 is also provided in the forward extremity of the tongue member 22 whereby the unitary trailer and dry dock may be attached to a suitable prime mover.

Vertical openings 48 extend through each of the side frames 6 of the dry dock 2 and are positioned adjacent the opposing ends of said side frames in which posts or poles 50 may be passed for anchoring the dry dock 2 in a desired position on land or water. Although only two of such openings have been shown in each of the side frames of the dry dock, a greater number may be provided, if greater stability is desired.

As illustrated in FIG. 7, the dry dock may be anchored at a body of water by means of the poles 50, it being contemplated that the poles will be of appropriate length to adjust to any land contour. The dry dock may be anchored either in a body of water or upon dry land, as desired.

As shown in FIGS. 4–6, the trailer 4 may be adapted for use as a utility trailer by the employment of a collapsible carrier unit therewith. Said carrier unit, which is generally designated by the numeral 52, may be constructed of light weight metal or wood and superposed upon the support members 18 and 20 of the trailer 4. When in the collapsible position illustrated in FIG. 5, the carrier 52 will rest between the dry dock 2 and trailer 4.

Said carrier 52 is comprised of a rectangular base member 54 and opposite side board members 56 and a head board member 58 hingedly connected thereto.

The base member 54 is releasably affixed to the support members 18 and 20 of the trailer 4 as by the bolts 60 and nuts 62.

The side board members 56 are connected to the base member 54 as by hinges 64. When in the erect position, said side board members rise vertically from the plane of the base member 54.

The head board member 58 is pivotally connected to the forward extremity of the base member 54 as by hinges 66. The head board 58 also rises vertically from the plane of base member 54 when in the erect position.

Hinges 68 may serve to hold the head board 58 firmly in place relative to the side boards 56 when all are in the erect position. When it is desired to collapse said head board and said side boards, the pin 70 is withdrawn from each of the hinges 68, allowing each of said hinges to separate and the head board and side boards to be collapsed.

It is contemplated that the combination trailer and boat dock may be purchased either with or without the carrier unit 52. If desired, said carrier unit may be permanently affixed to the trailer 4 at the time of manufacture. Or, if desired, said carrier may be purchased separately and affixed to the trailer as described.

The manner of employment of the combination dry dock and trailer will now be described.

The trailer 4 is affixed to an attachment device on the rear of a prime mover "P" utilizing the eye 46 in combination with a chain, rope or the like.

The upright posts 32 are adjusted to the proper height for the size and contour of the hull of the craft to be transported. The prow of the boat is then placed upon the rearmost rollers 40 and moved forwardly toward the forward extremity of the dry dock, passing over the other pairs of rollers 40.

Upon reaching the desired destination, the trailer 4 is backed to the edge of the water and the dry dock securely anchored in place as by the posts 50. The line is cast off from the staff 42 and the boat is slipped easily into the water over the rotatable rubber rollers 40 of the dry dock.

The bolts 28 and the nuts 30 may then be removed, thereby releasing the dry dock 2 from attachment to the trailer 4, so that the trailer may then be drawn away from the dry dock by the prime mover and used separately as a utility trailer, if desired.

The dry dock 2 may be placed thereafter in any location or position, the same being determined by the desires and requirements of the user, and the terrain contours encountered.

When the boat is not in use, it is easily mounted upon the dry dock and is therefore protected from the damaging effects of waves and wind experienced by small craft anchored in the water.

The dry dock, therefore, provides a semi-permanent docking place for those not having slips or piers on lakes or other bodies of water.

It is anticipated that the user may berth small craft under their own power on the dry dock, thereby obviating the necessity for pulling or hauling the boat into position on the dry dock.

The protection which is sought for this invention is covered by the language of the specification and the spirit represented thereby and same is limited only by the prior art and the scope of the appended claim.

What is claimed as new and useful is:

In a combination boat trailer and dock comprising, a wheeled trailer unit formed from spaced longitudinal side frame members connected together by spaced transversely extending cross members, a boat supporting dock unit separable from said trailer unit and formed from spaced longitudinal side frame members connected together by spaced transversely extending cross members, the side frame members of said trailer unit and the cross members of said dock unit being releasably held together by bolts, pairs of spaced opposite vertically extending side posts being adjustably pinned to the side frame members of said dock unit, and pairs of shafts, each shaft of said pair being pivotally connected at its upper end to one of the side posts of one of said pair thereof, the shafts of each of said pairs thereof being pivotally interconnected at their lower ends adjacent one of said cross members of said dock unit, and boat supporting rollers journalled on each shaft of each of said pairs thereof.

References Cited in the file of this patent

UNITED STATES PATENTS

| | | |
|---|---|---|
| 2,389,338 | Zorc | Nov. 20, 1945 |
| 2,917,194 | Streater | Dec. 15, 1959 |